United States Patent [19]

Meyerhofer

[11] 3,909,123
[45] Sept. 30, 1975

[54] INDEXING SYSTEM FOR MICROFICHE VIEWER

[75] Inventor: Dietrich Meyerhofer, Princeton, N.J.

[73] Assignee: RCA Corporation, New York, N.Y.

[22] Filed: Jan. 21, 1974

[21] Appl. No.: 434,924

[52] U.S. Cl. .................................................. 353/27
[51] Int. Cl.² .......................................... G03B 23/08
[58] Field of Search ........................... 353/25, 26, 27

[56] References Cited
UNITED STATES PATENTS
2,660,920   12/1953   McChesney ........................... 353/27
3,748,032   7/1973   Kyle ....................................... 353/27

FOREIGN PATENTS OR APPLICATIONS
942,117   1/1969   France ................................. 353/27

Primary Examiner—Richard E. Aegerter
Assistant Examiner—A. Jason Mirabito
Attorney, Agent, or Firm—Edward J. Norton; George J. Seligsohn

[57] ABSTRACT

An indexing system is utilized wherein the location of an image to be viewed through a microimage transparency is found by reference only to pagination on the transparency. Each increment along a first axis of the transparency corresponds to a range of pages located along an axis orthogonal to the first axis.

1 Claim, 1 Drawing Figure

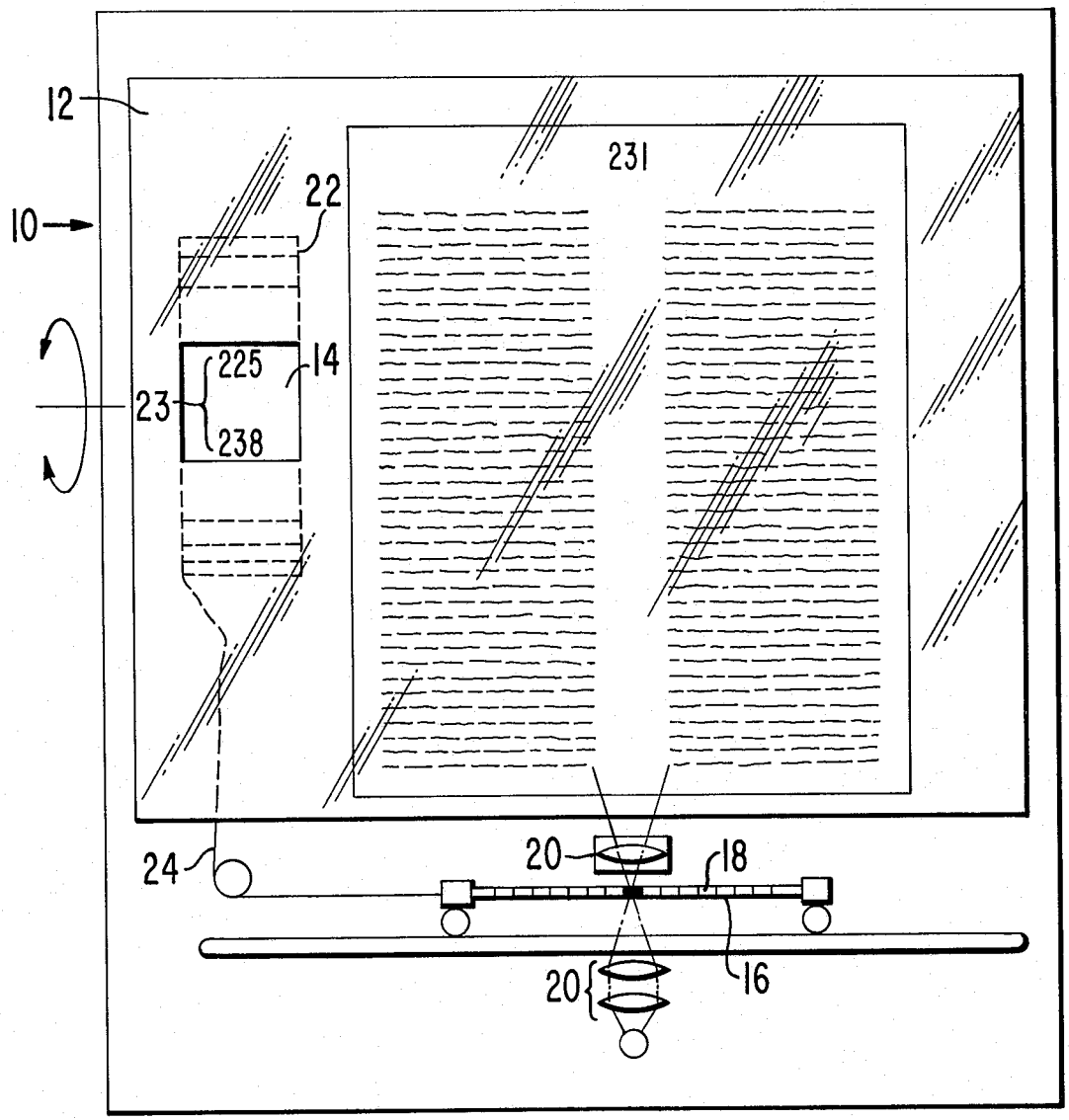

INDEXING SYSTEM FOR MICROFICHE VIEWER

BACKGROUND OF THE INVENTION

This invention relates to an indexing system for a transparency viewer, and particularly to such a system wherein one dimensional pagination is used rather than the conventional two dimensional approach.

A microfiche card is a particular transparency containing a plurality of pages of information arranged in a matrix fashion. The microfiche card is attached to a carrier which may be moved in an x-y plane to position the proper page for viewing. Most commercial microfiche viewers and viewer/copiers use a manually operated mechanical addressing system of a pantographic type to permit the user to readily select a particular page on the microfiche card for viewing. The particular page desired is found with the help of a pointer attached to the carrier. The coordinates of the particular page desired are found by placing a standard microfiche card on the carrier and moving the pointer to a particular position so as to find the index which lists the location of the page by two dimensions, e.g., A6, etc. The pointer moves over an index card upon which the proper coordinates of the page desired can be found.

The conventional indexing system is practical and inexpensive, but, as the index card is located in a different place from the display screen, the user is obligated to change his viewing from one to the other, e.g., the index card is generally on the front bottom of the viewer, while the screen is near vertical above it. At large magnifications, e.g., 50× and greater, the coordinates on the index card become small enough to cause difficulty in perceiving the correct information. Furthermore, employing a two dimensional pagination scheme, e.g., A1, A2, ... etc., causes difficulty as extraneous information is utilized to determine the location of information generally numbered as pages.

SUMMARY OF THE INVENTION

An indexing system for a viewer wherein information on a transparency is utilized. The system includes a carrier capable of motion along a first axis of the transparency it carries and along an axis orthogonal to the first axis. Means are provided wherein each incremental location along a first axis of the transparency indicates a range of pages along an axis orthogonal to the first axis.

BRIEF DESCRIPTION OF THE DRAWING

The drawing is a schematic front view of one form of the indexing system of the present invention.

DETAILED DESCRIPTION

Referring to the drawing, an indexing system of the present invention is designated generally as 10. The indexing system 10 includes a viewing screen 12 having an opening 14 therein. A carrier 16 is provided for mounting and providing motion for a microfiche card 18. An index wheel 22 having display information 23 located on its circumference is located in back of the opening 14 in the screen 12. The wheel 22 is positioned whereby revolution of the wheel 22 takes place in a plane at right angles to the viewing screen 12 so that the display information 23 located along the circumference of the index wheel 22 can be viewed through the opening 14 in the screen 12. The carrier 16 is capable of motion along at least two axes of the microfiche card 18. For example, the carrier 16 can move along an axis of the microfiche card 18, e.g., the x axis, and an axis orthogonal to this axis, e.g., the y axis. A lens projection system 20 is provided for forming the desired image on the screen 12.

The carrier 16 is connected to the index wheel 22 by a linkage 24, e.g., string, wire etc. The linkage permits the wheel 22 to be affected only by motion along one of the appropriate orthogonal axes, e.g., the x axis. The range of pages displayed on the circumference of the index wheel 22 can be displayed in characters as large as desired as long as the wheel is correctly synchronized with motion along the x axis.

In the use of the indexing system 10 of the present invention, a particular page is located by first moving the carrier 16 along the linked axis, e.g., the x axis, until the display information 23, located along the circumference of the index wheel 22, viewed through the screen opening 14, indicates a range of pages within which the particular page is located. The carrier 16 is then moved along the nonlinked axis, e.g., the y axis, to find the particular page desired. The page numbers are displayed on each page as in a book so as to avoid the difficulty of first finding coordinates of the image, e.g., A6, and then locating the image on the index card by means of appropriate positioning of a pointer. The images on the microfiche card 18 are arranged wherein one particular position of the carrier 16 corresponds to the beginning of the range displayed on the index wheel 22. The matrix can be standardized so that a number of positions are reserved for Roman numerals. It is only necessary that the matrix arrangement be standardized as required by the user. The indexing system 10 of the present invention can be constructed through well known methods wherein the linkage 24 is connected to the carrier 16 and the index wheel 22 such that each incremental motion along the appropriate axis causes the range of pages located along the orthogonal axis to appear along the circumference of the index wheel 22 which is viewed through the screen opening 14.

Although the indexing system of the present invention has been described for finding a particular image on a microfiche card, the system would be equally successful for locating an image on any two dimensional transparency, e.g., a focused image hologram. Furthermore, the system can operate successfully with either an x linked axis or a y linked axis. In addition, although an index wheel is described to display the appropriate information, any other equivalent means would also be successful, e.g., an electrical display can be utilized to indicate the corresponding range of pages located orthogonally to a first axis.

I claim:

1. A transparency viewer for viewing a microfiche card having a given plurality of series of indexed pages recorded thereon, each of said given plurality of series occupying a separate row on said card, said viewer comprising a. stationary means including a viewing screen having an index window hole therein and a lens projection system for imaging a selected single page on said viewing screen, b. a carrier for mounting said microfiche card which is movable with respect to said stationary means both in a first direction which is orthogonal to the direction of a row and in a second direction which is along a row, whereby movement of said carrier in said first and second directions permits any single page to be selected for projection, and c. carrier-moving means including a rotatable index wheel mounted to have only an incremental portion of its circumference revealed through said index window hole, linkage means linking said index wheel to said carrier to incrementally move said carrier in said first direction in response to rotation thereof, so that each increment of said index wheel corresponds with the projection of a page from a different row, each revealed incremental portion of the circumference of said index wheel manifesting identity information of all the pages in the series of the row corresponding to that revealed incremental portion, the movement of said carrier in said second direction being independent of said index wheel and said linkage means.

* * * * *